May 21, 1968     S. N. WEISSMAN ET AL     3,384,691
METHOD FOR MOLDING A STRUCTURE HAVING A FOAMED PLASTIC CORE
SUBSTANTIALLY ENCLOSED WITHIN AN ESSENTIALLY
UNFOAMED PLASTIC LAYER
Filed Sept. 10, 1965     2 Sheets-Sheet 2

STANLEY N. WEISSMAN
CLIFFORD L. WEIR
INVENTORS

BY *Francis H. Deel*

ATTORNEY

United States Patent Office 3,384,691
Patented May 21, 1968

3,384,691
METHOD FOR MOLDING A STRUCTURE HAVING A FOAMED PLASTIC CORE SUBSTANTIALLY ENCLOSED WITHIN AN ESSENTIALLY UNFOAMED PLASTIC LAYER
Stanley N. Weissman, Cedar Grove, and Clifford L. Weir, Wayne, N.J., assignors, by mesne assignments, to Allied Chemical Corporation, New York, N.Y., a corporation of New York
Filed Sept. 10, 1965, Ser. No. 486,482
15 Claims. (Cl. 264—47)

ABSTRACT OF THE DISCLOSURE

The invention more specifically relates to improving the surface quality of shaped plastic structures having a foamed plastic core and produced within a mold cavity from molten plastic material containing a blowing agent, said shaped structure being produced within the mold cavity by first cooling of the molten plastic under pressure to solidify a portion of the molten plastic as outer surface of the shaped structure followed by a reduction of pressure to expand the blowing agent and form the foam plastic core, said improvement in surface quality being effected by preheating of the mold to a temperature within at least 80° F. of the melting point of the polymer prior to introduction of the molten polymer into the mold.

---

The present invention relates to a novel and useful process for preparing a foamed product. More particularly, it relates to an improved process for forming a shaped structure having a foamed plastic core substantially enclosed within an essentially unfoamed plastic layer.

It is known in the art that a shaped structure can be produced having a foamed plastic core substantially enclosed within an essentially unfoamed plastic core. A particularly preferred apparatus for forming such a product is described in U.S. patent application 445,435, filed Apr. 5, 1965 and now abandoned. The process of forming such a product is described in U.S. patent application 251,256, filed Jan. 4, 1963 now Patent No. 3,211,605. One disadvantage of preparing such a product by the process described in the aforementioned application is the fact that product has a rough textured surface apparently due to bubbles from the blowing agent at the mold surface when the molten polymer is initially injected into the mold cavity. Since the final shaped structure must generally have a smooth surface, the resulting article from the process must be ground, polished, and finished before use as bowling pins, furniture legs and the like. Another disadvantage is the fact that when pigments are mixed with the plastic, they uniformly color the resulting plastic article giving the article a definite plastic appearance rather than any resemblance to a wooden product. Quite obviously, if the resulting product from the mold could be made with a smooth finished surface and the appearance of grained wood, the process would receive widespread acceptance in the art whenever a substitute for wood is desired.

It is an object of the present invention to provide a process in which the article contains a smooth polished surface when removed directly from the mold. A further object is to impart a wood grain effect to the article from the flow patterns in the structure surface. Another object is to provide a smooth surface which does not require machining, grinding, buffing and polishing. A still further object is to minimize scrap. A still further object is to mold the exact dimensions of the final product. Another object is to eliminate defective moldings caused by uneven flow of the plastic in the mold. Other objects will become apparent as the description of the invention proceeds.

These objects are accomplished by the present invention which provides an improved process for forming a shaped structure having a foamed plastic core substantially enclosed within an essentially unfoamed plastic layer by introducing a molten plastic containing a blowing agent into a mold cavity, cooling the molten plastic in the cavity while maintaining sufficient pressure on the molten plastic core so as to substantially prevent bubble formation in the plastic until it solidifies as an outside layer at least about 1/16" thickness and thereafter reducing the pressure on the molten plastic core to allow the blowing agent to form a foamed plastic core; the improvement comprising preheating the mold to a temperature within at least 80° F. of the melting point of the polymer prior to the introduction of the molten plastic into the mold cavity.

In a preferred embodiment of the present invention, the plastic is polystyrene or polyethylene and the unfoamed plastic layer is at least about 1/8" in thickness and, more preferably, 1/4" or greater in thickness. In the preferred embodiment, the mold temperature employed is preferably of from about 140° F. to 300° F. and, more preferably, about 180° F. to about 220° F. In any case, the mold is not heated above the degradation temperature of the polymer.

In a still more preferred embodiment of the present invention, a pigment is employed in the process so as to give flow patterns to the finished article which vary closely resemble the grain of natural wood.

The expression "shaped structure" signifies any structure having the foamed plastic core covered with the unfoamed plastic layer. Of course, the dimensions of the structure must be such that the unfoamed plastic layer is at least about 1/16 inch in thickness and covers the foamed core.

The term "plastic" is used to signify any of the conventional polymeric materials which are thermoplastic and suitable for conventional molding procedures. The term includes polyesters, such as poly(ethylene terephthalate), the polycarbonamides such as 6-nylon and 66-nylon and other such materials as are well-known in the art. A particularly preferred plastic is polystyrene or high density polyethylene (i.e., having a density above about 0.940) homopolymer and copolymers. The preparation of polyethylenes is disclosed in U.S. Patent 2,825,721. However polypropylene and many other plastics would likewise be operable.

The term "substantially enclosed" merely signifies that substantially all of the core is surrounded by the unfoamed layer. It is to be understood, however, in order to form the foamed core one or more outlets must be provided to allow expansion of the foam and, correspondingly, these outlets, when severed from the main structure, will show foam in this area. In general, such foamed areas on the final structure will represent less than 20% of the total surface area and in most instances will represent less than 5% of such area.

The expression "essentially unfoamed plastic layer" designates that the blowing agent contained in the unfoamed plastic layer has not formed any substantial amount of bubbles. Obviously, if a gas is employed as a blowing agent or if a volative liquid is so employed, the outside layer will contain a small number of bubbles which in general are insignificant wtih respect to the number and size contained in the foamed core.

The pressure that is applied to the structure during formation wil prevent or retard the decomposition of the blowing agent in the outside layer. When the pressure is released, the core will foam. Correspondingly, the outside layer may contain the blowing agent in an undecomposed form while the core contains the same agent in the decomposed form. For the purpose of this invention, such differences art considered insignificant and correspondingly both the core and the outside layer are considered to have essentially the same chemical composition.

The expression "blowing agent" is used in its conventional sense to mean any material suitable for incorporation into plastics to form bubbles therein by the application of heat, reduction in pressure and the like as is known in the art. Among the suitable blowing agents which may be used in the practice of the present invention are gases such as nitrogen or the very volatile liquid fluorocarbons such as 1,2-dichloro-tetrafluoroethane and the like. The more preferred blowing agents, however, are the chemical agents which decompose with the liberation of a gas as one of the decomposition products. Such material include barium azodicarboxate, 4,4'-oxybis(benzenesulfonylhydrazide), bis-benzenesulfonyl hydrazide, 4,4'-oxybis(benzenesulfonyl semicarbazide), dinitrosopentamethylene-tetramine, tryhydrazinosym.-triazine, and 1,1'-azobisformamide. Other blowing agents are disclosed in U.S. Patents 2,532,243, 2,804,435, 2,819,231, 2,927,904, 2,948,664 and others. A particularly preferred blowing agent is azodicarbonamide as disclosed in U.S. Patent 2,804,435.

The term "degradation" temperature of the polymer is used to signify any temperature which causes substantial decomposition of the polymer in the mold cavity. The actual temperature employed for the mold cavity depends upon the polymer employed, the temperature of the polymer from the extruder, the pigments added to the polymer and the like.

The term "pigment" is used to mean any coloring agent conventionally used in the art to impart a color to the final product. It includes fillers, dyes, pigments and other coloring agents. Pigments such as the inorganic pigments, titanium dioxide, cadmium sulfo-selenide, cadmium mercury, chrome-tine, cadmium sulfide, titanium pigments, ceramic yellows (antimony titanium-chrome oxide) cobalt aluminate, chrome-cobalt-alumina and chrome green may be added to the resin. Organic pigments such as carbon black, bone black, phythalocyanine blue and green, nickel-azo compound and the like can also be used. Other suitable materials are disclosed in a reprint, "Colorants for Plastics," by James E. Simpson, taken from "Modern Plastics Encyclopedia" (1963).

When pigments are added to the polymer they are generally added in amounts of from about 0.05 to about 10% by weight, based on the weight of the polymer. In a preferred embodiment, the pigments are added in amounts of from about ½ to about 4% and, more preferably, from about 1 to about 3%.

The invention is hereinafter more fully described by reference to the drawings.

In the accompanying drawings, which illustrate preferred embodiments of the invention:

Figure 1:
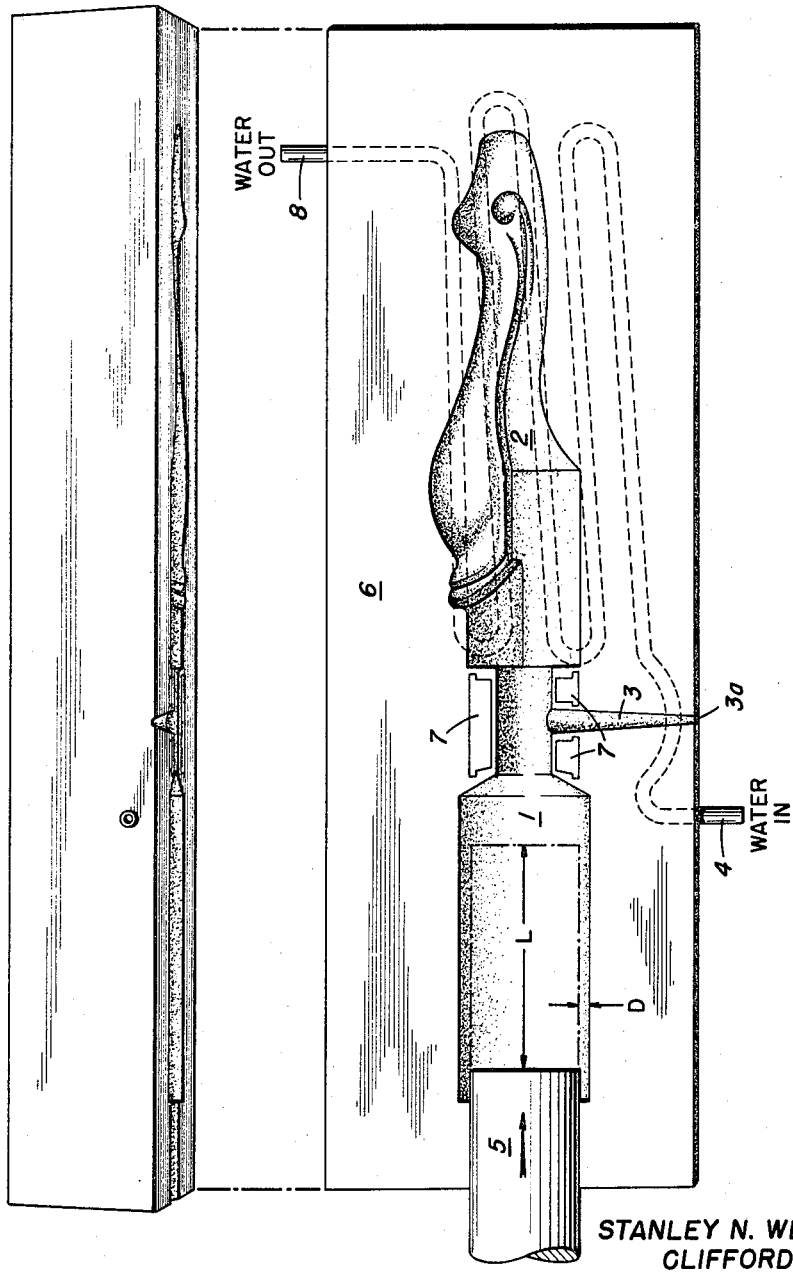
FIGURE 1 shows schematically a two-section partially open mold.

In FIGURE 1, the reservoir 1 is flowably connected to the mold cavity 2 which in turn is flowably connected to the inlet port 3. The body of the mold 6 houses the entire assembly which is divided into two break-away sections although more sections may be used in other types of molds. Steam (other heating means may be used) is circulated through cooling means 4 and exit 8 to preheat the mold prior to the introduction of the molten plastic. In operation, the assembled mold is positioned on a conventional injection molding machine and the molten plastic containing the blowing agent is injected through the inlet end 3a of the inlet port 3 to completely fill the mold cavity 2 and the reservoir 1. The inlet port 3 is gradually constricted towards the inlet end 3a so that as a cooling fluid is passed through a cooling means 4 the plastic in the inlet port is solidified to form a plug which resists any pressure transmitted to it from the mold cavity 2. As an alternative procedure, the nozzle can be held in place to prevent any polymer from leaving the inlet port 3. After solidification of the plug, pressure is applied to the plunger 5 while simultaneously cooling the mold cavity 2 by means of a liquid circulating through the cooling means 4 and the exit 8.

Sufficient pressure is maintained on the plunger 5 to prevent the blowing agent in the plastic from forming a gas as the outer layer solidifies next to the mold surface. The pressure is maintained in the mold cavity 2 for a sufficient time to allow the outer layer of unfoamed plastic to solidify to a thickness of at least 1/16 inch and preferably 1/8 or 1/4 inch. As soon as the desired thickness is obtained, the pressure is released on the mold cavity 2 by withdrawing the plunger 5 which allows the blowing agent to form gas in the mold cavity and correspondingly expand the plastic back into the reservoir 1. To prevent the punger 5 from being frozen in the advance position, the distance D is at least 1/16 of an inch, preferably, at least 1/4 inch, along the length of normal movement L of the plunger 5 so that any solidification of the polymer around the walls of the reservoir 1 will not interfere with the advancement or retraction of the plunger 5 during the process. As an optional feaure of the invention, the mold is provided with an electrical (or other) heating means 7 for heatng the mold in the area adjacent the connection of the reservoir to the mold cavity.

Figure 2:
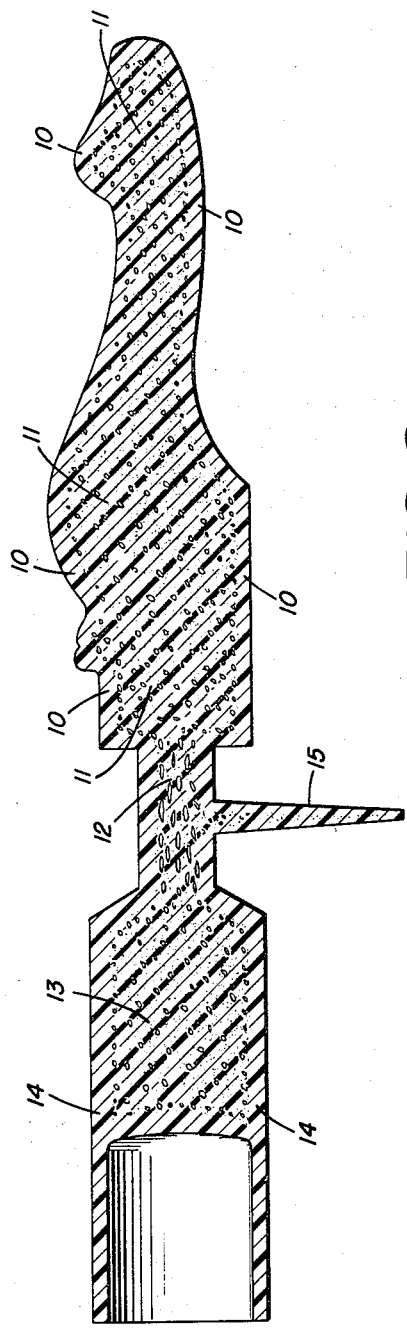
FIGURE 2 shows in cross section the molded product produced by such a mold.

FIGURE 2 shows in cross section the molded product produced by operating in accordance with the present invention. The molded product contains a foamed plastic core 11 which is integrally united with an unfoamed plastic layer 10 which substantially completely encloses the foamed plastic core. Obviosuly, while the unfoamed plastic layer 10 is being formed within the mold cavity (after the sprue 15 has been solidified) solidification also takes place in the cylinder so that an unfoamed plastic layer 14 is formed around a foamed core 13.

In practice, the foamed core 13 of the cylinder would be unfoamed until the solid outer layer 10 is soldified to the desired extent in the mold cavity. When the desired thickness is reached, pressure is released on the molten polymer containing the blowing agent thereby forming a foamed core 11 by forcing plastic and gas out through the port 12 into the cylinder which is now allowed to expand by the withdrawl of the piston. The resulting product is a foamed plastic core substantially enclosed with an essentially unfoamed plastic layer and it is to noted that both the core and foam have essentially the same chemical composition.

The following examples are give to illustrate the invention and are not intended to limit it in any manner.

The polystyrene employed in the following examples is a commercial high impact polystyrene resin having the following properties; tensile strength at break, p.s.i., 320 (ASTM–D638); tensile elongation, percent 40, (ASTM–D638); tensile modulus, p.s.i. ($10^5$), 3.2 (ASTM–D638); flexural modulus, p.s.i. ($10^5$), 3.2 (ASTM–D690); impact strength, izod, ft./lbs./inch of notch 1/4″ thick test bar, 2.0 (ASTM–D256); heat distortion temp., °F. at 264, p.s.i. unannealed 170 (ASTM–D648); specific gravity, 1.04, (ASTM–D792); and hardness Rockwell scale L, 46 (ASTM–D785).

EXAMPLE 1

A mold is constructed as described in the drawing (omitting the heating means as is shown) with a mold cavity in the form of a finished furniture leg having the approximate shape shown in the drawing. The approximate dimension of the mold cavity with relation to the molded products are, length 10½″, maximum width of 3″. The reservoir is cylindrical in shape with a length of 6″ and width of 2½″. The plunger in the reservoir is also cylindrical in shape with a length of 8″ and a diameter of 2.

Pellets of a commercial high impact polystyrene resin (previously described) are dry blended in a conventional double cone blender with ½% by weight of azo-dicarbonamide ($NH_2 \cdot CO \cdot NH \cdot NH \cdot CO \cdot NH_2$) for about 10 minutes.

The mold is preheated to a temperature of 200° F. with steam. The high impact polystyrene/blowing agent blend is injected into the above described heated mold at a temperature of 350° F. employing an injection pressure of 12,000 p.s.i. The nozzle of the injection mold machine is held in place with a holding pressure of 8,000 p.s.i. Tap water (60° F.) is then run through the mold to cool the mold and sprue while holding the plunger in the advanced position (about 5½″ forward). Cooling is continued for 1½ minutes and then the plunger is retracted about 5½″ within the reservoir to compensate for the volume change attending the expansion of the foam as it is formed in the center of the mold cavity.

After approximately 3 minutes, at which time substantially complete solidification has taken place, the furniture leg is removed from the mold. The approximate weight of the furniture leg (when cut from the sprue and the solidified plastic left in the inlet portion around the plunger in the reservoir) is approximately 255 grams as compared to a solid furniture leg of the same plastic which weighs 370 grams. Upon cutting the furniture leg lengthwise with a saw, the solid outside layer is approximately ⅛″ and appears substantially as shown in the drawing. The furniture leg has a very smooth outside surface which requires little if any buffing and polishing before use.

Control

The procedure of Example 1 is repeated with the exception that the mold is not heated. The mold is at the temperature of the tap water used for cooling.

The resulting furniture leg is similar to the product in Example 1 but it has a rough textured surface which would require grinding, buffing, and polishing before it could be used in furniture.

EXAMPLE 2

The procedure of Example 1 is repeated employing the same resin with a mixture of pigments. The pigments were a commercial brown iron oxide pigment 1.4% cadium yellow 0.6% and carbon black 0.016%, the percentages being based on the weight of the resin. All other conditions of Example 1 remain the same.

The resulting finished furniture leg exhibited flow patterns very similar in appearance to the grain of natural wood. As a result of the smooth finish of the product and the grain very closely resembling wood, the furniture leg is particularly well suited for commercial use.

Control

When the procedure of Example 2 is repeated with the exception that the mold is not preheated, the resulting furniture leg has a rough textured surface and the flow patterns resembling the natural wood grain are not present.

EXAMPLE 3

When the procedure of Example 1 is repeated employing a 1½% azodicarbonamide and a high density polyethylene homopolymer having a density of 0.960 and a melt index of 5.0, substantially the same results are obtained.

While the amount of blowing agent in the plastic is not critical, it is generally desirable to employ from about 0.05 to about 10% by weight, based on the weight of the polymer, when the blowing agent is a chemical blowing agent. Preferably, from about 0.2 to about 6% by weight of blowing agent is employed. Similarly, the temperature of the plastic may be selected as desired, but of course it must be above the softening point and below the degradation temperature of the polymer. For polystyrene or polyethylene homopolymer and copolymers a temperature of from about 270° F. to about 525° F. is suitable with temperatures of from about 270° F. to about 350° F. being preferred. With other polymers, higher or lower temperatures may be desirable.

While the invention has been described with reference to specific embodiments, many equivalent modifications will be apparent to those skilled in the art from a reading of the foregoing without a departure from the inventive concept.

We claim:

1. In a process for forming a shaped structure having a foamed plastic core substantially enclosed within an essentially unfoamed plastic layer by introducing a molten plastic containing a blowing agent into a mold cavity, cooling the molten plastic in the cavity while maintaining sufficient pressure on the molten plastic core so as to substantially prevent bubble formation in the plastic until it solidifies as an outside layer at least about 1/16″ in thickness and thereafter reducing the pressure on the molten plastic core to allow the blowing agent to form a foamed plastic core; the improvement which comprises preheating the mold to a temperature within at least 80° F. of the melting point of the polymer prior to the introduction of the molten plastic into the mold cavity.

2. The process of claim 1 wherein the plastic is polystyrene.

3. The process of claim 1 wherein the plastic is polyethylene.

4. The process of claim 1 wherein the mold is heated to a temperature of from about 140° F. to about 300° F.

5. The process of claim 1 wherein the mold is heated to a temperature of from about 180° F. to about 220° F.

6. The process of claim 1 wherein the plastic contains a pigment.

7. The process of claim 1 wherein the pressure is maintained on the molten plastic core until the outside layer solidifies to a thickness of at least ⅛″.

8. The process of claim 1 wherein the pressure is maintained on the molten plastic core until the outside layer solidifies to a thickness of at least ¼″.

9. The process of claim 6 wherein the pigment is present in amounts of from about 0.05 to about 10% by weight.

10. The process of claim 6 wherein the pigment is present in amounts of from about ½ to about 4% by weight.

11. The process of claim 6 wherein the pigment is present in amounts of from about 1 to about 3% by weight.

12. In the process for forming a shaped structure having a foamed polystyrene core substantially enclosed within an essentially unfoamed polystyrene layer by introducing a molten polystyrene containing a blowing agent and a pigment into a mold cavity, cooling the molten polystyrene in the cavity while maintaining sufficient pressure on the molten polystyrene core so as to substantially prevent bubble formation in the polystyrene until it solidifies as an outside layer at least 1/16″ in thickness and thereafter reducing the pressure on the molten polystyrene core to allow the blowing agent to form a foamed polystyrene core; the improvement which comprises preheating the mold to a temperature of from about 180° F. to about 220° F. prior to introducing the molten polystyrene into the mold cavity.

13. The process of claim 12 wherein the pigment is present in amounts of from about 0.05 to about 10% by weight.

14. The process of claim 12 wherein the pigment is present in amounts of from about ½ to about 4% by weight.

15. The process of claim 12 wherein the pigment is present in amounts of from about 1 to about 3% by weight.

References Cited

UNITED STATES PATENTS

| | | | |
|---|---|---|---|
| 3,058,161 | 10/1962 | Beyer et al. | 264—47 |
| 3,211,605 | 10/1965 | Spaak et al. | 264—321 XR |
| 3,268,636 | 8/1966 | Angell | 264—48 XR |
| 3,306,960 | 2/1967 | Weissman et al. | 264—48 XR |

JAMES A. SEIDLECK, *Primary Examiner.*

P. E. ANDERSON, *Assistant Examiner.*